United States Patent
Yoon

(10) Patent No.: US 10,742,161 B2
(45) Date of Patent: Aug. 11, 2020

(54) PHOTOVOLTAIC MODULE INSTALLATION ROOF RENEWAL METHOD USING PORTABLE ROLL FOAMING MACHINE, AND ROOF RENEWAL STRUCTURE OBTAINED THEREBY

(71) Applicants: Sukkyu Yoon, Goyang-si (KR); I-SOLAR ENERGY CO., LTD., Goyang-si, Gyeonggi-do (KR)

(72) Inventor: Sukkyu Yoon, Goyang-si (KR)

(73) Assignee: I-SOLAR ENERGY CO., LTD., Goyang-si, Gyeonggi-do (KR)

( * ) Notice: Subject to any disclaimer, the term of this patent is extended or adjusted under 35 U.S.C. 154(b) by 0 days.

(21) Appl. No.: 16/086,571

(22) PCT Filed: Mar. 21, 2017

(86) PCT No.: PCT/KR2017/003028
§ 371 (c)(1),
(2) Date: Sep. 19, 2018

(87) PCT Pub. No.: WO2017/164622
PCT Pub. Date: Sep. 28, 2017

(65) Prior Publication Data
US 2019/0103831 A1    Apr. 4, 2019

(30) Foreign Application Priority Data
Mar. 22, 2016 (KR) .......................... 10-2016-0033914

(51) Int. Cl.
*H02S 20/25*      (2014.01)
*E04D 1/34*       (2006.01)
(Continued)

(52) U.S. Cl.
CPC ............ *H02S 20/25* (2014.12); *E04D 1/34* (2013.01); *E04D 3/363* (2013.01); *E04D 13/00* (2013.01);
(Continued)

(58) Field of Classification Search
None
See application file for complete search history.

(56) References Cited

U.S. PATENT DOCUMENTS

| 5,367,848 A | 11/1994 | McConnohie |
| 8,938,924 B1 | 1/2015 | Smith |

(Continued)

FOREIGN PATENT DOCUMENTS

| CN | 103233559 A | * | 8/2013 | ............. E04D 15/04 |
| DE | 102007036206 A1 | * | 2/2009 | ............. F24S 25/35 |

(Continued)

OTHER PUBLICATIONS

CN103233559A, Machine Translation, Chen (Year: 2013).*
DE-102007036206-A1, Machine Translation, Niemetz (Year: 2009).*
PCT International Search Report, PCT/KR2017/003028, dated Jun. 14, 2017, 5 Pages.

*Primary Examiner* — Devina Pillay

(74) *Attorney, Agent, or Firm* — Fenwick & West LLP

(57) ABSTRACT

A photovoltaic module installation roof renewal method for installing a photovoltaic module on a roof of a building constructed with a roof frame having a repetitively formed crest and root includes the steps of: interposing an insulator at the roots of the roof frame; producing a photovoltaic module installation roof panel in a length corresponding to the length of the roof at a roof renewal site by using a portable roll foaming machine to transport the photovoltaic module installation roof panel onto the roof; installing the photovoltaic module installation roof panel on the roof frame at which the insulator is interposed; fastening a bracket for installing a photovoltaic module on the photo- (Continued)

voltaic module installation roof panel; and installing the photovoltaic module on the bracket.

1 Claim, 3 Drawing Sheets

(51) Int. Cl.

| | | |
|---|---|---|
| *E04G 23/02* | (2006.01) | |
| *E04D 3/363* | (2006.01) | |
| *E04D 13/16* | (2006.01) | |
| *E04D 15/04* | (2006.01) | |
| *E04D 13/00* | (2006.01) | |
| *H02S 30/00* | (2014.01) | |
| *H02S 20/23* | (2014.01) | |
| *F24S 25/615* | (2018.01) | |
| *H02S 30/10* | (2014.01) | |

(52) U.S. Cl.
CPC ....... *E04D 13/006* (2013.01); *E04D 13/1681* (2013.01); *E04D 15/04* (2013.01); *E04G 23/02* (2013.01); *F24S 25/615* (2018.05); *H02S 20/23* (2014.12); *H02S 30/00* (2013.01); *H02S 30/10* (2014.12); *Y02B 10/12* (2013.01)

(56) References Cited

U.S. PATENT DOCUMENTS

| | | |
|---|---|---|
| 2011/0215213 A1 | 9/2011 | Poivet et al. |
| 2012/0079775 A1 | 4/2012 | Chamberlin et al. |
| 2012/0285533 A1* | 11/2012 | Chang .................. H02S 20/23 136/259 |
| 2014/0345212 A1 | 11/2014 | Yoon |

FOREIGN PATENT DOCUMENTS

| | | |
|---|---|---|
| DE | 20-2011-108518 U1 | 3/2013 |
| EP | 2 375 185 A2 | 10/2011 |
| EP | 2 807 429 B1 | 4/2016 |
| JP | 2000-087515 A | 3/2000 |
| JP | 2001-323620 A | 11/2001 |
| JP | 2004-084380 A | 3/2004 |
| JP | 2014-532128 A | 12/2014 |
| KR | 10-2014-0070927 A | 6/2014 |
| KR | 10-1484750 B1 | 1/2015 |
| KR | 10-2015-0013990 A | 2/2015 |
| KR | 10-2016-0018228 A | 2/2016 |
| WO | WO 2005/032739 A1 | 4/2005 |
| WO | WO 2013/164806 A1 | 11/2013 |
| WO | WO 2014-159566 A1 | 10/2014 |

* cited by examiner

PHOTOVOLTAIC MODULE INSTALLATION ROOF RENEWAL METHOD USING PORTABLE ROLL FOAMING MACHINE, AND ROOF RENEWAL STRUCTURE OBTAINED THEREBY

FIELD OF THE INVENTION

The present invention relates to a photovoltaic module installation roof renewal method using a portable roll forming machine and a roof renewal structure obtained thereby; and, particularly, to a new photovoltaic module installation roof renewal method using a portable roll forming machine that avoids water leakage, has excellent structural safety, and allows for simple construction and a reduced construction period, and a roof renewal structure obtained thereby.

BACKGROUND OF THE INVENTION

An old roof of a building is typically renewed when water leaks or heat insulation deteriorates. Recently, however, a roof may be renewed to install a photovoltaic module for photovoltaic power generation.

In general, a roof panel is manufactured as a sandwich panel type in which a heat insulator is interposed between two metal panels, or manufactured as a single panel type by roll-forming a single metal plate. Most roof panels have a fitting projecting bar and an elastic clip at both ends thereof in a width direction regardless of the type of roof panel, with the elastic clip connected and fitted to a fitting projecting bar of a neighboring panel in the width direction.

Due to factory space limitations or logistical difficulties, a roof panel is cut to an arbitrary length and then transported. Therefore, when a roof is being constructed, a plurality of roof panels needs to be connected in a longitudinal direction to have a length corresponding to the length of the roof. However, since there is no structure that allows for the superimposition of neighboring panels at the end portions in the longitudinal direction of the roof panel, unlike at the end portions in the width direction, the roof panels need to be connected in the longitudinal direction by using additional connecting members. Using additional connecting members makes the process inconvenient and time consuming, and furthermore, allows for water leaks.

In addition, the presence of a plurality of connecting portions of the roof panels on the roof reduces the structural safety of the roof.

SUMMARY OF THE INVENTION

In view of the above, the present invention provides a photovoltaic module installation roof renewal method using a portable roll forming machine that avoids concerns for water leakage due to the non-existence of connecting portions in the longitudinal direction of the roof panel and ensures excellent structural safety, simple and stable construction and installation of a photovoltaic module, and a reduced construction period, and a roof renewal structure obtained thereby.

In accordance with an aspect of the present invention, there is provided a photovoltaic module installation roof renewal method for installing a photovoltaic module by using a portable roll forming machine on a roof of a building constructed with a roof frame having a repetitively formed crest and root, the method comprising the steps of: interposing a heat insulator at the root of the roof frame; producing a photovoltaic module installation roof panel in a length corresponding to a length of the roof at a roof renewal site by using the portable roll forming machine and transporting the photovoltaic module installation roof panel onto the roof frame; installing the photovoltaic module roof panel on the roof frame at which the heat insulator is interposed; fastening a bracket for installing a photovoltaic module on the photovoltaic module installation roof panel; and installing the photovoltaic module on the bracket.

Effects Of The Invention

In the present invention having the above-described configuration, a photovoltaic module installation roof panel 100 is manufactured to have a length corresponding to the length of a roof at a roof renewal site and be used for roof renewal. Therefore, there is no connecting portion in the longitudinal direction of the photovoltaic module installation roof panel 100 and accordingly, the conventional problem of water leakage at the connecting portion in the longitudinal direction of the roof panel is resolved and the structural safety of the roof is improved.

Further, in the present invention, the roof is renewed without being removed and, thus, the renewal operation is simplified and the construction period can be shortened. Also, since it is required to interpose the heat insulator 4 on the roof and connect the roof panel 100 only in the width direction without being connected in the longitudinal direction, the construction of the roof panel 100 is simplified and the construction period can be shortened.

Moreover, due to the presence of a bracket fitting groove 124 for fitting a photovoltaic module installation bracket 40 to the photovoltaic module installation roof panel 100, a photovoltaic module can be easily constructed.

Therefore, in accordance with the present invention, it is possible to provide, by utilizing the old roof, a roof capable of photovoltaic generation with no concern for water leakage and excellent heat insulating properties at a low cost.

DETAILED DESCRIPTION OF THE EMBODIMENTS

Hereinafter, embodiments of the present invention will be described with reference to the accompanying drawings.

The present invention relates to a method of renewing a roof of a building constructed with metal roof panels in which crests and roots are extended along a longitudinal direction to a roof with photovoltaic module installation roof panels.

Figure 1:
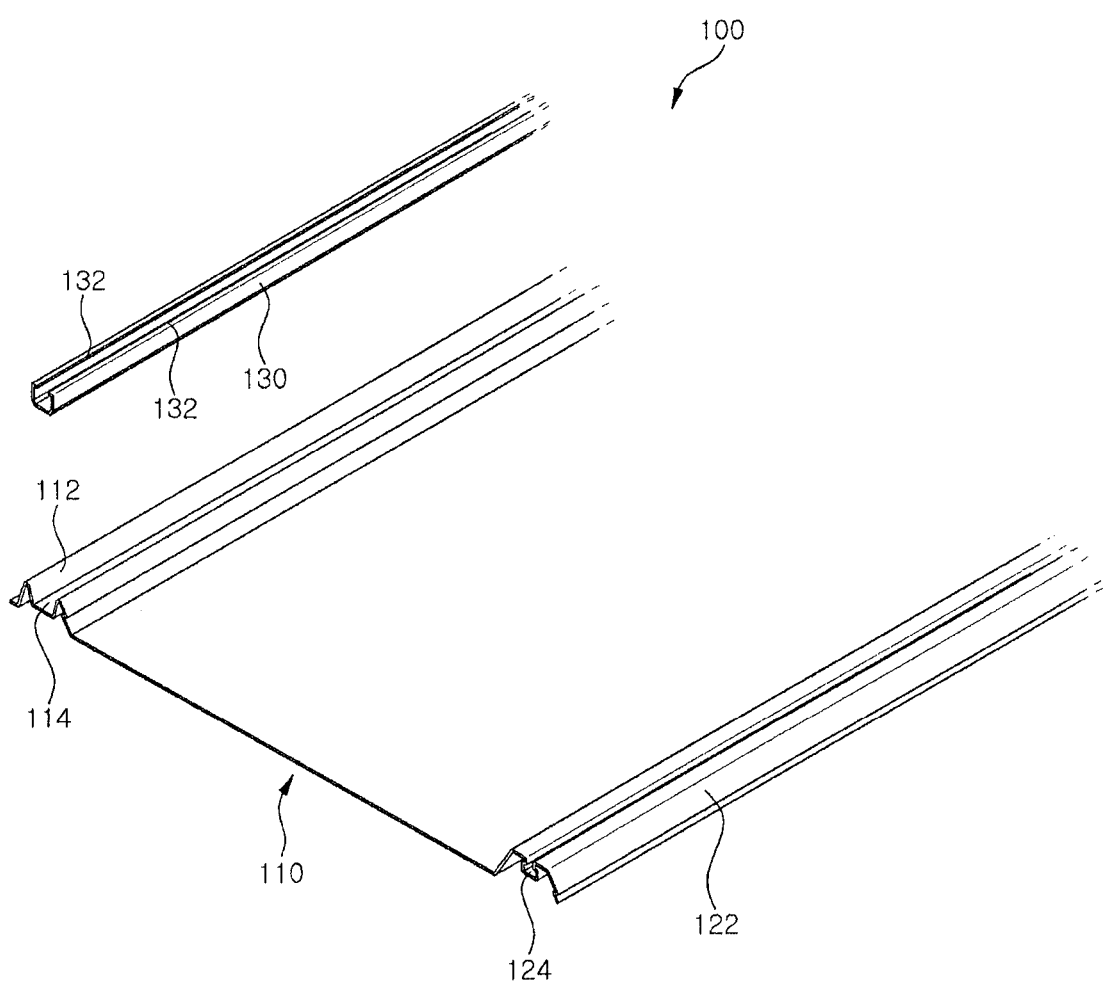
FIG. 1 an exploded perspective view of a photovoltaic module installation roof panel used in an embodiment of the present invention.

The photovoltaic module installation roof panel 100 used in the present invention is manufactured by roll-forming a metal plate. For example, as shown in FIG. 1, the photovoltaic module installation roof panel 100 includes a panel body 110 and a fitting rail 130. A fitting projecting bar 112 is provided at one end portion in the width direction of the panel body 110 and an elastic clip 122 is provided at the other end portion in the width direction of the panel body 110. The fitting rail 130 is inserted into the fitting projecting bar 112.

The following is a detailed description of the photovoltaic module installation roof panel 100. A concave groove 114 is extended along the longitudinal direction on the top surface of the fitting projecting bar 112. The fitting rail 130 is inserted into the concave groove 114 of the fitting projecting bar 112. Inwardly directed hooks 132 are formed at upper ends of both sidewalls in the width direction of the fitting rail 130.

Figure 2:
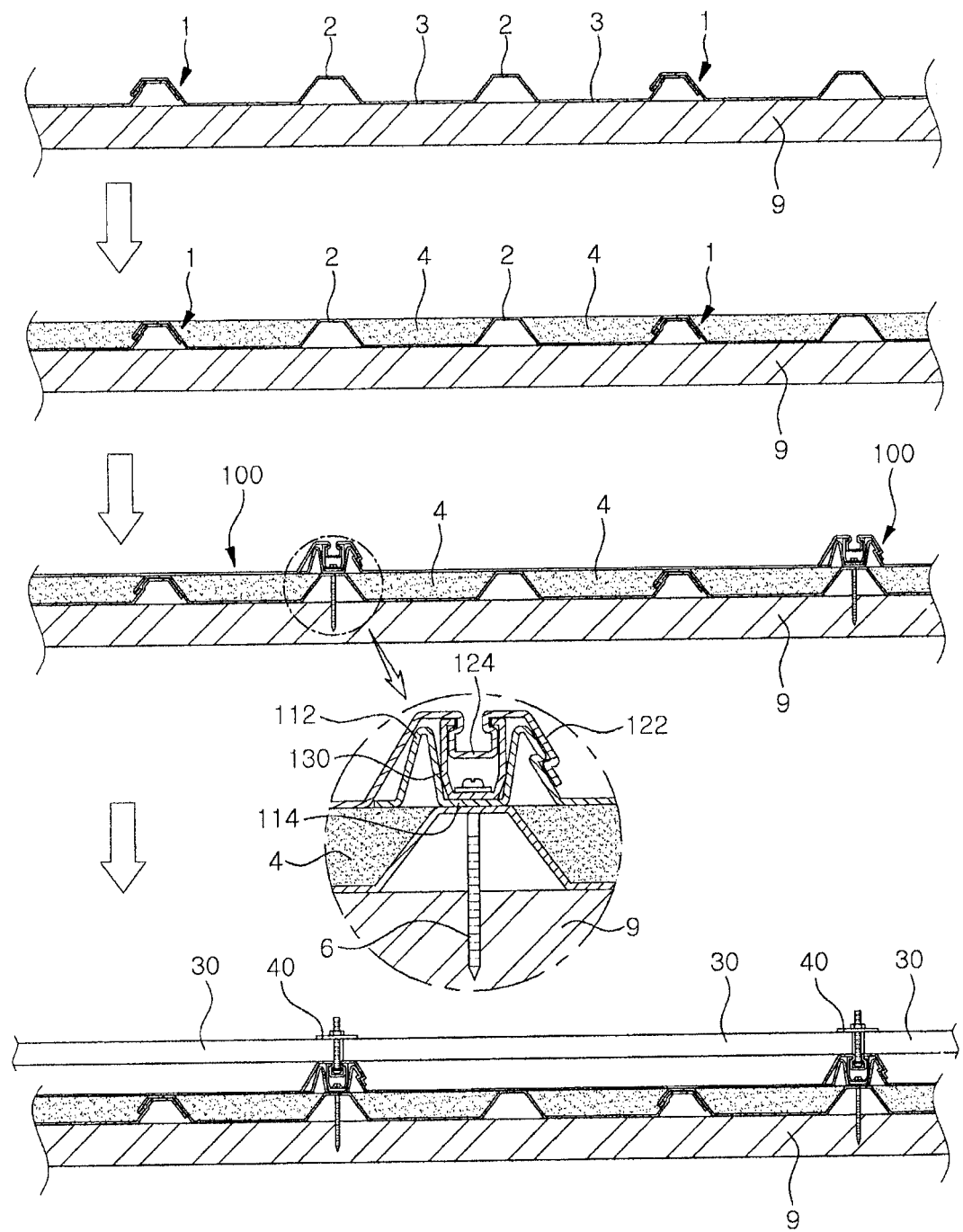
FIG. 2 shows the construction process of the above embodiment.

Referring to FIG. 2, the elastic clip 122 has a shape that allows the fitting projecting bar 112 to be accommodated therein. The elastic clip 122 of one roof panel 100 is elastically fitted to a fitting projecting bar 112 of a neighboring roof panel 100. A bracket fitting groove 124 to be inserted into the fitting rail 130 is formed on the top surface of the elastic clip 122. A bracket 40 for installing the photovoltaic module 30 is fitted to the bracket fitting groove 124.

As will be described later, the roof panel 100 is fixed to the roof by fastening a bolt 6 to the fitting rail 130, and the elastic clip 122 of the roof panel 100 is elastically fitted to the fitting projecting bar 112. In this manner, a plurality of roof panels 100 are connected and assembled in the width direction. The bracket fitting groove 124 is inserted into the fitting rail 130 by fitting the elastic clip 122 to the fitting projecting bar 112. The bracket fitting groove 124 is prevented from being separated from the fitting rail 130 by the hooks 132 formed at the upper ends of the fitting rail 130. Accordingly, the fitting force between the elastic clip 122 and the fitting projecting bar 112 is improved.

The photovoltaic module installation roof panel 100 has a length corresponding to the length of the roof to be renewed. In other words, in the case of a gable roof, the roof panel 100 has a length corresponding to the length from the ridge to an cave of the roof. In the case of a flat roof or a roof inclined on one side, the roof panel 100 has a length corresponding to the length of the roof in order to prevent water leakage and improve the structural stability without providing connecting portions in the longitudinal direction of the roof panel 100 at the time of the roof renewal, as will be described later.

For a photovoltaic module installation roof panel 100 to have the above-described length, the panel is required to be manufactured at a considerable length. However, as described above, it is substantially difficult to manufacture and supply the photovoltaic module installation roof panel 100 having the required length due to manufacturing factory space limitations, logistical problems, and the like.

Figure 3:
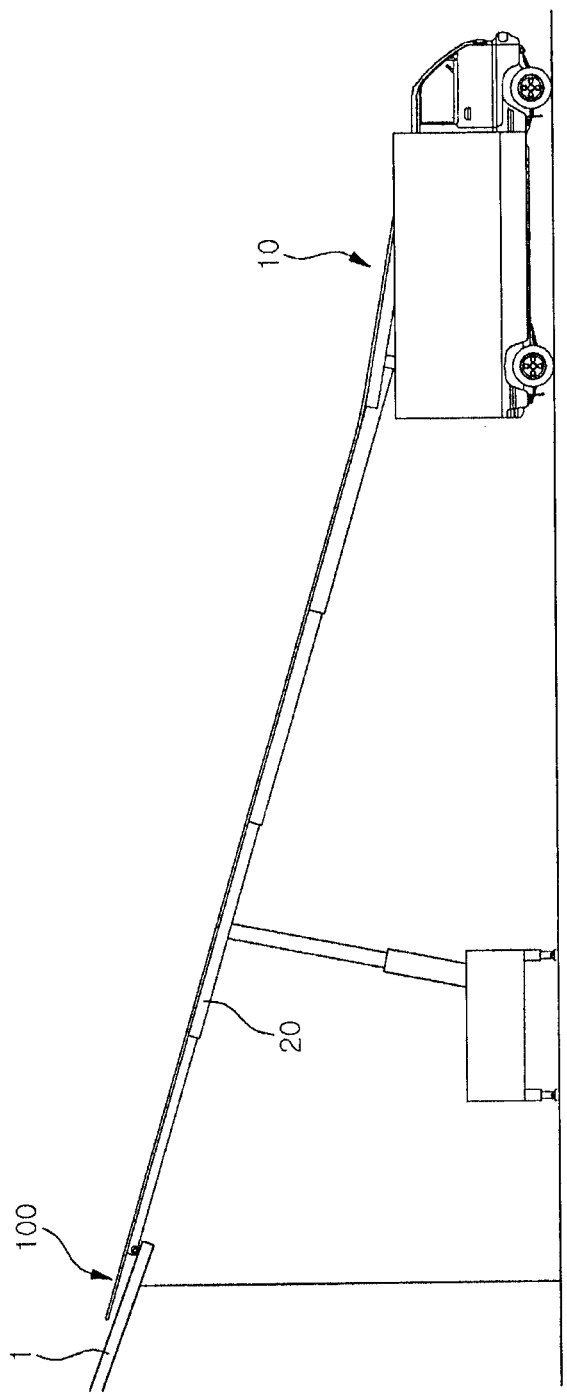
FIG. 3 shows the production and lifting of the roof panel.

Therefore, in the present invention, the photovoltaic modulation installation roof panel 100 is directly manufactured and used at the roof renewal site. In other words, the roof panel 100 is manufactured at the site where the roof is renewed by using a portable roll forming machine 10, i.e., in an open space. For example, as shown in FIG. 3, a lifting device 20 is provided in front of the portable roll forming device 10 so that the roof panel 100 that is roll-formed by the portable roll forming machine 10 can be directly lifted onto the roof of the building.

Since the photovoltaic module installation roof panel 100 is manufactured in the open space and lifted up to the roof, the roof panel 100 can be produced to have a length corresponding to the length of the roof.

A loading carrier loaded with the portable roll forming machine 10 is connected to a vehicle. Preferably, as illustrated in the drawing, the upper part of the loading carrier can be opened and closed and the roll forming machine projects from and retracts into the upper part of the open loading carrier. Since the portable roll forming machine 10 has a known configuration, detailed description thereof will be omitted.

Both the panel body 110 and the fitting rail 130 may be manufactured by the portable roll forming machine 10. However, it is also possible to assemble the pre-manufactured fitting rail 130 to the panel body 110 by using the portable roll forming machine 10. In some cases, it is possible to manufacture only the panel body 110 by using the portable roll forming machine 10, lift the panel body 110 onto the roof, and fit the fitting rail 130 to the panel body 110 on the roof. In addition, the photovoltaic module installation roof panel 100 can be manufactured by inserting a plurality of fitting rails 130 having a predetermined length into the concave grooves 114 of the fitting projecting bar 112.

The following is a detailed description of the process of renewing the roof of the building by using the photovoltaic module installation roof panel 100 configured as described above.

1) First, the roof of the building to be renewed is cleaned and unnecessary structures installed on the roof are removed.

2) Roots 3 of the roof frame 1 constituting the roof are filled with a heat insulator 4. A known material such as urethane foam or the like is used as the heat insulator 4.

3) The photovoltaic module installation roof panel 100 is manufactured and lifted onto the roof by using the portable roll forming machine 10.

As described above, the photovoltaic module installation roof panel 100 is directly manufactured and lifted onto the roof at the roof renewal site by using the portable roll forming machine 10. The photovoltaic module installation roof panel 100 is manufactured to have a length corresponding to the length of the roof to be renewed.

Therefore, the photovoltaic module installation roof panel 100 is connected only in the width direction without being connected in the longitudinal direction. As described above, the roof panel 100 is lifted up to the roof filled with the heat insulator 4. Then, the photovoltaic module installation roof panel 100 is fixed to the roof frame 1 filled with the heat insulator 4 by fastening the bolt 6 to the fitting rail 130 inserted into the concave groove 114 of the roof panel 100. The bolt 6 penetrates through the roof panel 100 and the roof frame 1, and is inserted into and fixed to a support frame 9 of the roof.

In this manner, the photovoltaic module installation roof panel 100 is fixed to the roof (e.g., the roof frame and the support frame of the roof). Then, an elastic clip 122 of a neighboring roof panel 100 is inserted into the fitting projecting bar 112 of the pre-installed roof panel 100. By connecting the photovoltaic module installation roof panels 100 in the width direction, the roof panels 100 are constructed to completely cover the roof.

5) Next, the photovoltaic module 30 is installed on the photovoltaic module installation roof panel 100 installed on the roof.

A bracket 40 for installing the photovoltaic module 30 is fitted to the bracket fitting groove 124 of the roof panel 100, and the photovoltaic module 30 is installed by using the bracket 40. For example, as shown in FIG. 2, the position of the photovoltaic module 30 can be fixed by installing a part of the bracket 40 to be aligned with the bracket fitting groove 124. Since an inlet portion of the bracket fitting groove 124 is narrower than an internal space thereof, if the bracket 40 can be partially aligned with the bracket fitting groove 124, it is only required to fit the bracket 40 to the brace fitting groove 124 without any additional process of fixing the bracket 40 to the roof panel 100. For example, when the bracket fitting groove 124 has a T-shaped or a triangular cross section, the bracket 40 can have a neck and a head (greater in diameter than the neck). The head is supported on one surface of the photovoltaic module 30. The neck penetrates through the photovoltaic module 30. The end of the neck can be fitted to the bracket fitting groove 18, so to be accommodated in the internal space of the bracket fitting groove 124.

As described above, in the present invention, the roof is renewed into a roof on which a photovoltaic module can be installed without being removed. Therefore, the cost is reduced and the construction period is also shortened.

In particular, since the photovoltaic module installation roof panel 100 is directly manufactured and used at the roof renewal site, the photovoltaic module installation roof panel 100 can have the desired length without having to connect separate roof panels in the longitudinal direction. Accordingly, there is no connecting portion in the longitudinal direction of the photovoltaic module installation roof panel 100, which makes it possible to avoid concerns for water leakage and ensure a safer structure.

In addition, since there is no need to connect the roof panels in the longitudinal direction, the construction is simple, the construction efficiency is improved, and the construction period is shortened.

While the embodiments of the present invention have been described, the present invention is not limited to the above-described embodiments, and various modifications can be made within the scope of the technical idea of the present invention. Although the present invention has been described and illustrated in connection with the embodiments, it will be understood by those skilled in the art that various changes and modifications can be made without departing from the scope of the invention as defined in the following claims.

What is claimed is:

1. A photovoltaic module installation roof renewal method for installing a photovoltaic module by using a portable roll forming machine on a roof of a building constructed with a roof frame having a repetitively formed crest and root, the method comprising the steps of:

interposing a heat insulator at the root of the roof frame;

producing a photovoltaic module installation roof panel in a length corresponding to a length of the roof at a roof renewal site by using the portable roll forming machine and transporting the photovoltaic module installation roof panel onto the roof frame;

installing the photovoltaic module installation roof panel on the roof frame at which the heat insulator is interposed;

fastening a bracket for installing a photovoltaic module on the photovoltaic module installation roof panel; and installing the photovoltaic module on the bracket, wherein the photovoltaic module installation module roof panel includes:

a panel main body having, at one end portion in a width direction, a fitting projecting bar with a concave groove on a top surface thereof along a longitudinal length and, at the other end portion in the width direction, an elastic clip elastically inserted into a fitting projecting bar of a neighboring photovoltaic module installation roof panel; and a fitting rail inserted into the concave groove, and wherein the elastic clip has a bracket fitting groove to be inserted into the fitting rail and the bracket is fitted to the bracket fitting groove.

* * * * *